United States Patent Office 2,970,082
Patented Jan. 31, 1961

2,970,082
ALUMINUM NICOTINATE COMPOSITIONS FOR HYPERCHOLESTEREMIA

Joseph P. Miale, New Rochelle, N.Y., assignor to Walker Laboratories, Inc., Mount Vernon, N.Y., a corporation of New York No Drawing. Filed Oct. 7, 1958, Ser. No. 765,724

4 Claims. (Cl. 167—65)

This invention relates to new articles of manufacture for the control of hypercholesteremia.

Clinical studies in recent years have revealed that massive doses of nicotinic acid bring about prompt and substantial reduction in the level of cholesterol and total lipids in the blood stream in persons with hypercholesteremia. Daily doses of from 3 grams to 6 grams of nicotinic acid are required to bring about significant reduction in the cholesterol content of the blood. Although nicotinic acid in these dosage levels is relatively non-toxic, yet administration of these amounts of the vitamin cause disagreeable side reactions such as flushing, pruritis, urticaria, dryness of the skin, blurring of vision and still other undesirable reactions. As little as 50 milligrams of nicotinic acid when taken orally may cause this syndrome to occur. Various salts of nicotinic acid such as the sodium, ammonium and potassium salts also produce these undesirable side reactions to an objectionable degree. Although nicotinamide is as effective as nicotinic acid as a vitamin and does not produce the flushing syndrome caused by nicotinic acid, yet for some reason it is ineffective in reducing blood cholesterol levels.

The flushing syndrome is extremely disagreeable to many persons, and they refuse to begin or continue the treatment with nicotinic acid to provide control of their blood cholesterol levels. It is, therefore, desirable that some means of administering nicotinic acid which will not produce the flushing syndrome be made available. The present invention provides a solution to the problem.

I have discovered that the aluminum salt of nicotinic acid can be administered orally in amounts of 3 to 6 grams per day in dosage levels of 50 to 2000 milligrams to provide a substantial reduction in the blood cholesterol levels of persons with hypercholesteremia without, however, producing the objectionable flushing syndrome. The reason why aluminum nicotinate acts in this advantageous manner is not presently known; but it may be that because of its particular chemical and/or physical properties, it decomposes slowly in the digestive tract, thereby releasing nicotinic acid into the blood stream at a rate slow enough to avoid development of the undesirable reactions that are encountered when large doses are administered at one time.

Aluminum nicotinate is prepared by dissolving nicotinic acid in hot water and adding a slurry of aluminum hydroxide to it. A slight excess of aluminum hydroxide is used in order that the final product would be free of nicotinic acid. The precipitate is collected on a filter and dried. The final product contains a mixture of aluminum nicotinate and a small but acceptable amount of aluminum hydroxide.

The aluminum nicotinate described above may be administered in a variety of dosage unit forms; for example, 50 to 2000 milligrams of the drug may be enclosed in a gelatin capsule along with pharmaceutically acceptable excipients. The aluminum nicotinate may be granulated and pressed into tablets of desired dosage unit sizes by conventional processes. The aluminum nicotinate may be made into granules with an acceptable pharmaceutical carrier and administered as such, preferably in food or drink. The aluminum nicotinate may be made into a mixture, an emulsion, or magma with suitable suspending or emulsifying agents and flavors. These new articles of manufacture are relatively stable and can be packaged and distributed in commerce without difficulty.

*Example I*

Tablets suitable for oral administration which will provide the equivalent of 500 milligrams of nicotinic acid may be prepared from the following ingredients:

| | Parts by weight |
|---|---|
| Aluminum nicotinate | 580 |
| Maltose | 25 |
| Sucrose | 25 |
| Corn starch | 20 |
| Magnesium stearate | 3 |

The aluminum nicotinate and starch are mixed and wetted with an aqueous solution of the maltose and sucrose which serve as binding agents. The moist mixture is passed through a screen and air dried to obtain granules. These granules are ground, screened and formed into tablets on a conventional tabletting machine. 653 milligrams of the granulated material will form the desired tablet.

If desired, suitable amounts of F.D. and C colors may be added to the dried mixture prior to granulation. Also, the tablets may be coated as desired. Other binding agents such as gum acacia, gelatin, glucose and the like may be used in place of those named above. Similarly, other diluents or disintegrating agents such as powdered sucrose, lactose, carboxymethylcellulose, kaolin and dicalcium phosphate may be used to provide the desired volume of the finished tablet.

*Example II*

The dried granulation as described above may be used directly, preferably by mixing with soft food or in a drink such as milk.

Flavored granules can also be prepared by adding additional amounts of sugar and flavoring materials such as cocoa, vanilla extract or the like to taste.

*Example III*

Gelatin capsules may be filled with aluminum nicotinate in amounts sufficient to provide the desired dosage level. This may be mixed with dicalcium phosphate or other excipient to fill out the capsule selected.

*Example IV*

Mixtures, emulsions, or magmas may be prepared with aluminum nicotinate in amounts to provide the desired dosage level per spoonful or measuring glass. In such cases, suspending agents, thickeners, or emulsifiers may or may not be necessary for dispensing purposes.

I claim:

1. An article of manufacture for the control of hypercholesteremia which comprises in dosage unit form an amount ranging from 50 to 2000 milligrams of aluminum nicotinate associated with a pharmaceutically acceptable carrier.

2. An article of manufacture for the control of hypercholesteremia which comprises in dosage unit form an amount ranging from 50 to 2000 milligrams of aluminum nicotinate compressed into a tablet with a non-toxic excipient.

3. An article of manufacture for the control of hypercholesteremia which comprises a gelatin capsule containing from 50 to 2000 milligrams of aluminum nicotinate.

4. The process for reducing the blood levels of cholesterol in patients suffering from hypercholesteremia which comprises administering from 3 to 6 grams per day of aluminum nicotinate in dosages ranging from 50 to 2000 milligrams per dose.

References Cited in the file of this patent

UNITED STATES PATENTS

| | | |
|---|---|---|
| 2,230,616 | Dowzard | Feb. 4, 1941 |
| 2,447,234 | Dean | Aug. 17, 1948 |
| 2,932,659 | Orthner et al. | Apr. 12, 1960 |

OTHER REFERENCES

Parsons: JAMA, 165:3, Sept. 21, 1957, pp. 234–8.
Altschul: Br. Med. J., Sept. 20, 1958, pp. 713–714.